US005871590A

United States Patent [19]

Hei et al.

[11] Patent Number: 5,871,590

[45] Date of Patent: Feb. 16, 1999

[54] VEHICLE CLEANING AND DRYING COMPOSITIONS

[75] Inventors: Robert D. P. Hei, Oakdale; Michael E. Besse, Golden Valley; Terry J. Klos, Victoria; Keith D. Lokkesmoe, Savage; James J. Tarara, Woodbury; Kimberly L. Person Hei, Oakdale, all of Minn.

[73] Assignee: Ecolab Inc., St. Paul, Minn.

[21] Appl. No.: 810,120

[22] Filed: Feb. 25, 1997

[51] Int. Cl.[6] .............................. B08B 3/00; C09K 13/06

[52] U.S. Cl. .................................... 134/26; 134/2; 134/6; 252/79.4; 252/79.5; 510/189

[58] Field of Search ................................. 252/79.2, 79.4, 252/79.5; 134/2, 3, 6, 25.5, 26–29, 32, 34, 40, 41; 510/189

[56] References Cited

U.S. PATENT DOCUMENTS

| | | | |
|---|---|---|---|
| 3,440,063 | 4/1969 | Chestochowski et al. | 106/8 |
| 3,592,669 | 7/1971 | Baker et al. | 106/2 |
| 3,756,835 | 9/1973 | Betty, Jr. et al. | 106/11 |
| 4,284,435 | 8/1981 | Fox | 134/2 |
| 4,803,012 | 2/1989 | Wershofen . | |
| 4,864,060 | 9/1989 | Karalis et al. | 564/292 |
| 5,221,329 | 6/1993 | Tarr | 106/2 |
| 5,258,063 | 11/1993 | Cifuentes et al. | 106/3 |
| 5,330,673 | 7/1994 | Bayless | 252/171 |

FOREIGN PATENT DOCUMENTS

| | | |
|---|---|---|
| 0 043 360 | 1/1982 | European Pat. Off. . |
| 3-24200 | 2/1991 | Japan . |
| 5-156289 | 6/1993 | Japan . |
| 6-145603 | 5/1994 | Japan . |
| 1 349 447 | 4/1974 | United Kingdom . |
| 2 036 783 | 7/1980 | United Kingdom . |
| WO 92/08823 | 5/1992 | WIPO . |
| WO 92/22632 | 12/1992 | WIPO . |
| WO 97/39093 | 10/1997 | WIPO . |

*Primary Examiner*—William Powell

*Attorney, Agent, or Firm*—Merchant, Gould, Smith, Edell, Welter & Schmidt, P.A.

[57] ABSTRACT

A touchless car wash composition, that can be made from a concentrate and diluted to use concentration using commonly available service water can comprise an ether amine or diamine in particular a fatty ether amine or diamine. The novel compositions are typically free of hydrocarbon solvents and silicone materials that are common in prior art compositions. The compositions are used in touchless car wash processes in which the materials are sprayed in the form of an aqueous dilute solution to remove soil from the vehicle surface. The aqueous compositions are self removing and very small amounts of the aqueous solutions remain to create water spotting on cleaned vehicle surfaces. The novel compositions of the invention can also contain a variety of other ingredients in a fully formulated system. Such ingredients include rapid dewatering of painted surfaces, improved cleanliness of glass and painted surfaces. A substantial reduction of water spotting and concentrates stability. When used in systems using the direct contact between a brush, the friction between the brush and the vehicle surface is substantially reduced.

44 Claims, No Drawings

VEHICLE CLEANING AND DRYING COMPOSITIONS

FIELD OF THE INVENTION

This invention relates to aqueous compositions that can be used in washing, rinsing or dewatering of vehicle surfaces. Such surfaces can be made of glass, rubber, painted surfaces, steel and aluminum wheels, plastic panels, thermoplastic/fabric or thermoplastic/fiber composite panels, plastic lenses and a variety of glass or metal composites and plastic trim pieces. The compositions of the invention are typically sprayed or wiped onto a vehicle surface for the purpose of removing a variety of soils common in the transportation, railway, airport, highway, etc. environment. Such soils are derived from fuels, lubricants, hydraulic and other functional fluids, dirt and grime, vehicle exhaust components, residue from prior cleaners, waxes, etc. Preferably, the compositions of the invention are used in either brushed, fabric contact or touchless systems. Such touchless systems involve a simple spray-on of the aqueous systems followed by an aqueous rinse leaving a clean vehicle surface, the surface comprising little or no residual cleaning composition or rinse.

BACKGROUND OF THE INVENTION

Soiled vehicle surfaces have been cleaned for many years using a variety of compositions and methods. Such compositions can be as simple as solutions of organic dish soaps or common all-purpose utility cleaners. In commercial or industrial vehicle cleaning such as semi-automatic and completely automatic car washes, a variety of cleaning materials have been used in a cleaning system that can often contain a pre-rinse or pre-cleaning step, a cleaning step followed by a combination of one or more steps using waxes, rinses, anti-rust agents, mechanical dryers, etc. Such vehicle cleaning operations can be embodied in a retail cleaning operations designed for cleaning vehicles by personal owners or by car wash personnel. Such cleaning stations can also include stations operated by car rental agencies, retail car dealerships, automobile fleet operators, bus sheds, train depots, airplane maintenance buildings, etc.

One class of commonly available automotive cleaning materials contain a variety of anionic surfactants that is used in conjunction with compatible nonionic surfactants, sequestrants, waxes and other ingredients.

Hydrocarbon wax compositions, applied after the aforementioned cleaning step, promote a shiny finish and are blended to promote removal of water from the vehicle surfaces. Such waxes also often contain a wax with anionic or nonionic surfactants, anti-rust agents and other components that form a fully functional system that can dewater automobiles leaving a dry shiny finish.

A second class of waxing composition is commonly available including a typical formulation containing surfactants, solvents and a silicone wax-like material that forms a shiny surface. Silicones are well known, very hydrophobic materials that when used in vehicle waxing compositions with other components such as nonionic detergents, anti-rust agents, etc. to form a shiny, dry vehicle surface.

One common theme in the prior art cleaning compositions is an anionic material (typically a sulfonate or sulfate surfactant), while the prior art waxing compositions require hydrocarbon or silicone wax materials.

Amine compounds have also been commonly formulated in hydrocarbon containing and silicone containing wax compositions and compositions that contain both hydrocarbons and silicants. For example, Chestochowski et al., U.S. Pat. No. 3,440,063 teaches fatty amine-organic acid salts in car wash formulations. Baker et al., U.S. Pat. No. 3,592,669 discloses a hydrocarbon wax composition containing a fatty alkyl amine in a transparent film forming composition. Cifuentes et al., U.S. Pat. No. 5,258,063 discloses a gloss improving foam for use on vehicle surfaces. The film combines waxes with an alkyl cyclohexyl amine. Herring, GB 1,349,447 discloses a car polish composition comprising a paraffin wax combined with an alkyl diamine. Lastly, ABE, WO 92-22632 discloses a water repellent car window washing composition using a fatty amine acetate salt in combination with a hydrocarbon solvent and silicone wax in a complex formula containing a fluorocarbon active material. Fatty alkyl amines typically have the formula R-$NH_2$ wherein R is a hydrocarbon group that can have 1–3 unsaturated bonds but contain 6–24 straight chain carbon atoms.

Eriksson, WO 92-08823 discloses cleaning and degreasing agent containing an ethoxylated alkyl amine. Eriksson, EP 43360 teaches a metal corrosion protector comprising an ethoxylated amine composition. Lemin et al., GB 2,036,783 discloses a water repellent foam using a cationic dewatering agent comprising an ethoxylated amine that can also use an optional anti-static agent. Fatty ethanol amine amide compounds have been disclosed in, for example, in Bayless, U.S. Pat. No. 5,330,673 for use in adhesives and cleaners. Further, JP 06-145603 teaches a dewatering film form using triethanolamine and a hydrocarbon wax or silicone wax. JP 05-156289 teaches a vehicle cleaner containing short chain water soluble amines. Lastly, JP 03-024200 teaches a detergent for soil removal on vehicles using a short chain aqueous or nonaqueous amine.

Fox, U.S. Pat. No. 4,284,435 teach a car wash composition using an ethoxylated quaternary amine composition. Karalis et al., U.S. Pat. No. 4,864,060 teaches a car wash composition combining a quaternary ammonium compound and an amine oxide material. Betty, Jr. et al., U.S. Pat. No. 3,756,835 teaches an auto polish that combine a quaternary ammonium compound and an ethoxylated amine and a petroleum mineral oil. Tarr, U.S. Pat. No. 5,221,329 teaches a water repellent material used as a coating for aircraft comprising a quaternary ammonium compound and a saline compound. JP 03-262763 and JP 58-076477 disclose car wash compositions and anti-spotting coating compositions that can contain quaternary amine materials in combination with additives such as waxes, cationic surfactants, etc.

These prior art vehicle cleaning materials have had some success in the marketplace. However, the marketplace continually searches for materials having improved properties. Properties that can always use improvement include the gloss of the cleaned vehicle surface, the rate and amount of dewatering, water spotting on glass or painted surfaces, concentrate stability, solution clarity and overall ease of preparing aqueous dilutions from the aqueous concentrate materials. The marketplace has continually searched for improvements in aqueous systems containing organic cleaner materials that can have improved soil removal, improved gloss in the final vehicle surface, reduced spotting and improved dewatering. Lastly, the environmental compatibility of the hydrocarbon and silicone wax-like materials has been questioned in recent years. A substantial need exists to develop vehicle cleaners and rinses that can clean and shine with minimal aqueous residue in touchless or cloth or brush systems.

BRIEF DISCUSSION OF THE INVENTION

We have found that silicone and hydrocarbon wax-like materials can be substantially avoided in vehicle maintenance cleaning, drying or dewatering compositions if a fatty alkyl ether amine is used. We have found that in the conventional vehicle cleaning compositions conventional wax-like materials can be replaced in an aqueous cleaner, dewatering or drying agents by an alkyl ether amine or alkyl ether diamine of the formula $$R—O—(R_2)_n—NH—A$$

$$A═R_3NH_2 \text{ or } H$$

$R_2$, $R_3$=linear or branched alkyl

The ether amine and diamine compositions of the invention are typically formulated in liquid or solid aqueous concentrate materials in which the ether amine or diamine is combined with other compatible cleaning agents in a compatible aqueous concentrate that can be diluted with service water to form a material that can be readily applied (i.e.) sprayed onto a vehicle surface for the purpose of cleaning the vehicle surface leaving the vehicle with a shiny, glossy finish and with a minimum of water spotting or streaking. The amine is made compatable in the compositions of the invention using a stabilizing agent comprising a neutralizing acid or a nonionic surfactant. The stabilizing agent produces single phase ether amine compositions which can be clear solutions. A listing of the typical amine compounds used in the current art are shown in Table 11 (pages 38–39). In contrast to the prior art, anionic surfactants such as sulfates or sulfonates are not preferred and compositions of the invention are substantially free of amine reacting anionic materials. Such acid anionic materials like alkyl benzene sulfonates, alpha olefin sulfonates, and alcohol sulfates are believed to react with, neutralize and reduce the activity of the fatty amines of the invention.

For the purpose of this patent application, the term "vehicle" is intended to mean any transportation conveyance including automobiles, trucks, sport utility vehicles, buses, golf carts, motorcycles, monorails, diesel locomotives, passenger coaches, small single engine private airplanes, corporate jet aircraft, commercial airline equipment, etc. The term "touchless cleaning system" is directed to processes in which the cleaning materials are directly contacted with a vehicle surface comprising a painted surface, a thermal plastic composite surface, a glass surface, a rubber surface, or surfaces containing common automobile trim units for soil removal with a spray or flood with no added mechanical action used in soil removal. A "dewatering agent" promotes rapid and substantially complete drainage of aqueous residue on a vehicle surface. In use, an aqueous cleaner composition can be permitted to remain in contact with such surfaces for a relatively short period of time (less than 5 minutes) to promote soil removal. The aqueous systems are typically removed from the vehicle surface using an aqueous rinse followed by a dewatering agent. The term "hydrocarbon free wax" is intended to convey the concept that the materials of the invention do not contain a substantial proportion of any hydrocarbon that can participate in either soil removal, dewatering or providing a shiny coating to a vehicle painted surface. The term "silicone-free" is intended to convey the concept that the compositions of the invention are substantially free of silicone materials at concentrations typically available for the purpose of promoting a shiny surface, dewatering, water removal or spot or streak prevention. Trivial amounts of wax or silicone can be added within the scope of the invention. The term "anti-soiling" is intended to convey the concept that the materials of this invention aid in eliminating or repelling hard-surface water spots caused by soluble solids in rinse waters.

DETAILED DESCRIPTION OF THE INVENTION

The vehicle cleaning compositions of the invention can be formulated in a variety of formats. The drying agent simply promotes dewatering of a vehicle surface. The composition can also take the form of a car wash cleaner composition that is formulated simply to be a soil removing agent that after removal of the cleaner leaves a shiny surface that can be dried to an attractive finish. The materials can also be prepared as a car wash formulation that can wash, dry and leave a shiny, dry surface. Basic formulations, which can be used in liquid or solid form, are found in the wax and silicone free formulas set forth below:

| | Wt % | Preferred Wt % |
|---|---|---|
| **CARWASH** | | |
| Alkyl ether amine | 1–55 | 2–8 |
| Nonionic Surfactant | 1–55 | 5–15 |
| Amine oxide | 0–25 | 5–15 |
| Sequestrant | 1–10 | 5–10 |
| Base or Acid | Adj to desired pH | |
| Water | Balance | |
| **DRYING AGENT NEUTRAL AGENT (SOLUTION PHASE)** | | |
| Alkyl ether amine | 1–55 | 5–15 |
| Nonionic Surfactant | 0–20 can be used 0.1–20 is useful | 1–7 |
| Acid | To desired pH or solution clarity | |
| Water and/or solvent | Balance | |
| **NON-NEUTRALIZED AGENT (EMULSIFIED[1] PHASE)** | | |
| Alkyl ether amine | 1–50 | 5–15 |
| Nonionic (or blended nonionic) Surfactant | 1–20 | 3–10 |
| Water and/or solvent | Balance | |
| **WASH AND DRY CAR WASH FORMULA** | | |
| Alkyl ether amine | 0.1–50 | 2–10 |
| Nonionic Surfactant | 1–20 | 5–15 |
| Fatty amine ethoxylate | 0–20 | 1–10 |

-continued

| | Wt % | Preferred Wt % |
|---|---|---|
| Alkyl dimethyl amine-oxide | 0.1–20 | 5–15 |
| Sequestrant | 0.5–20 | 5–10 |
| Solvent (glycol ether) | 1–15 | 2–10 |
| Base (pH adjustment) | 0.1–5 | 1–3 |
| Silicate (aluminum protection) | 0.1–5 | 0.5–3 |
| Solidification agent | Optional | 0.1–30[2] |
| Water | Balance | Balance |

[1]Amine in water, dispersed amine in continuous aqueous phase.
[2]Solidification agent is used only if solid formulation is needed.

In general, the formulations can be liquid or solid and can contain the fatty ether amine compositions of the invention in combination with a variety of other materials useful in the manufacture of vehicle cleaning and dewatering agents including nonionic surfactants, amine oxide surfactants, sequestrants, acidic materials, basic materials, solvents, and a variety of other useful materials such as dyes, fragrances, thickening agents, foaming surfactants and others. Conventional hardeneing or solidification agents can be used including urea, PEG materials, nonionics, etc.

The vehicle maintenance compositions of the invention can contain a fatty ether amine compound of the formula:

$$R—O—(R_2)_n—NH—A$$

$$A=R_3NH_2 \text{ or } H$$

$R_2$, $R_3$=linear or branched alkyl
Preferred amines include tetradecyloxypropyl-1,3-diaminopropane; a $C_{12-14}$ alkyl oxypropyl-1,3-diaminopropane; a $C_{12-15}$ alkyloxypropyl amine and other similar materials that can be obtained in the market place under the tradename of TOMAH® DA19, DA18, DA17, DA1618, DA14, PA19, PA17, PA16, PA14, PA1214, etc.

Nonionic surfactants useful in cleaning compositions, include those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; dodecyl, octyl or nonylphenol ethoxylates, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the trademark PLURONIC™ (BASF-Wyandotte), and the like; and other like nonionic compounds. Silicone containing nonionic surfactants such as the ABIL B8852 or Silwet 7602 can also be used. The following materials are particularly preferred: fatty amines (coco, tallow, etc. amines) ethoxylated with 2 to 18 moles of ethylene oxide (EO), substituted amines of the formula: $R^1—O—R^2—NH—R^2—NH_2$, or ethoxylated species thereof, wherein $R^1$ is a fatty group, each $R^2$ is independently a $C_{1-6}$ alkylene; a poloxamine, an $(EO)_x(PO)_y—NH—R^2—NH_2$, wherein $R^2$ is a $C_{1-6}$ alkylene group; $C_{9-14}$ alcohol ethoxylated with 3 to 10 moles of ethylene oxide (EO), coco alcohol ethoxylated with 3 to 10 moles EO, stearyl alcohol ethoxylated with 5 to 10 moles EO, mixed $C_{12}$–$C_{15}$ alcohol ethoxylated with 3 to 10 moles EO, mixed secondary $C_{11}$–$C_{15}$ alcohol ethoxylated with 3 to 10 moles EO, mixed $C_9$–$C_{11}$ linear alcohol ethoxylated with 3 to 10 moles EO and the like. It is preferred that the nonionic have from 8 to 12 carbon atoms in the alkyl group. When this preferred alkyl group is used the most preferred nonionic is the mixed $C_9$–$C_{11}$ alcohol ethoxylated with 3–7 moles EO.

An important nonionic surfactant can comprise an amine oxide. Such materials are made by oxidizing a t-alkyl amine to an amine oxide. Preferred amine oxides are typically $C_{6-28}$ alkyl dimethylamine oxides. Representative examples of such amine oxides are lauryl dimethylamine oxide, dodecyl dimethylamine oxide, tetradecyl dimethylamine oxide, cetyl dimethylamine oxide, stearyl dimethylamine oxide, dodecyl diethylamine oxide, bis(2-hydroxypropyl) tetradecylamine oxide, etc.

Typical aqueous compositions combined with service water can contain the sequestrant to reduce the undesirable effects of typically di- and trivalent metal cations. Such cations can reduce the effect of a variety of the organic components of the formulations of the invention and can promote water spotting. Suitable chelating agents include both inorganic and organic chelating agents. Inorganic silicates, carbonates, phosphates, and borates are examples. Organic chelating agents include trisodium nitrilotriacetate, trisodium hydroxyethylethylenediamine triacetate, tetrasodium ethylenediamine tetraacetate, polyacrylic acid sodium salts and other sequestering or chelating agents well known in the industry.

The compositions of the invention can contain an acidic or basic material that can act to neutralize either a basic or acidic pH, respectively. Such basic materials include amines, sodium hydroxide, sodium silicate materials, etc. These materials can act as an alkaline builder, soil disbursement and buffering agent. The preferred silicate materials also act as an aluminum protectant that can reduce the impact of the chemicals of the invention on exposed aluminum surfaces. The alkaline builder material should be present in amounts sufficient to obtain a pH approximately neutral (i.e., about 6 to 10, preferably 6–9). A variety of typically weak or mild acids can be used to neutralize and solubilize the basic compositions to a variety of pH's. Such acids include acetic acid, hydroxyacetic acid, phosphoric acid, citric acid, and other typical acids used in the manufacture of cleaning compositions.

The formulations of the invention can contain a solvent material. The preferred chemistry requires no solvent. Preferred solvents comprise alcohols, glycols, glycol ether materials. Such materials tend to have aliphatic moieties containing 2 to 6 carbon atoms. Examples of such materials include ethanol, propanol, isopropanol, butanol, 2-butanol, 2-methyl-2-propanol, butoxy diglycol, ethoxy diglycol, polypropylene glycol, ethylene glycol methyl ether, ethylene glycol dimethyl ether, propylene glycol methyl ether, dipropylene glycol n-butyl ether, butoxy ethanol, phenoxy ethanol, methoxy propanol, propylene glycol, n-butyl ether, tripropylene glycol, n-butyl ether, propylene glycol, hexylene glycol and other similar oxygenated solvents.

EXAMPLE 1

Touchless Vehicle Wash Test 1

A series of "touchless" car washes were made, with and without an alkyl-ether diamine to test for detergency and dewatering effects. The test was done using a 1 wt % dilution of the footnoted formulas. The material was applied by (i) a low-pressure spray application of 100 ml of the diluted test solution to a 16 $ft^2$ side panel on a white 1994 Dodge Caravan, (ii) allowing a 30 second wait time, and (iii) finally a high (600 psi) pressure water rinse using approximately 0.5 gallon of well water.

Table 1 illustrates the improved painted surface dewatering effects when using the fatty ether amine, while also yielding good detergency. The panels were evaluated with a gloss meter for gloss, and visually for dewatering. The % gloss reading is a relative reference scale of black equals 0% and white equals 100% with cleaning enhancement indicated by an increased value; i.e., usually soiled surfaces are in the range of about 50–70% gloss while cleaned surfaces being about 90–110% gloss. Mirrored surfaces can be greater than 100%.

TABLE 1

Touchless Car Formula Tests Using An Alkyl Ether Diamine

| Run # | Detergent Formulas[3] | Vehicle Surface Final Gloss Reading[4] | Painted Surface 50% Dewatering Rate (min:sec)[5] |
|---|---|---|---|
| 1 | alkyl-ether-diamino formula D[6] | 98% | 0:09 |
| 2 | alkyl-ether-diamine formula C[7] | 101% | 0:05 |
| 3 | alkyl-ether-diamine formula B[8] | 91%[9] | 0:15 |
| 4 | conventional (non-amine) formula[10] | 96% | 2:26[11] |

[3]The footnoted detergent concentrates were made as listed, but used as 1.0 wt % dilutions.

[4]Gloss increase measured with a hand-held gloss meter; measuring the surface gloss after cleaning in 5 areas of the vehicles driver side surface (an avg. of 6 gloss measurements per area). The final gloss readings were after 5 minutes of drying.

[5]Dewatering rate = visual evaluation time for 50% of the water to drain from the surface.

[6]Formula D = 2.7% cocoamine 15 mole ethoxylate (Varonic K-215), 14% Na HEDTA (Versonol 120), 3.0% $C_{12-14}$ linear alkyl-oxypropyl-1,3-diamino propane (Tomah DA-1618), 3.2% $C_{12}$ alkyl dimethyl amine oxide, 10.0% nonionic surfactants, 0.25% NaOH, and the remainder as water.

[7]Formula C = 3.0% Varonic K-215, 14% Versonol 120, 5.0% Tomah DA-1618, 4.0% amine oxide, 10.0% Dowanol glycols, 0.25% NaOH, and the remainder as water.

[8]Formula B = 3.5% Varonic K-215, 14% Versonol 120, 5.0% Tomah DA-1618, 3.2% amine oxide, 11.0% nonionic surfactants, 2.5% Dowanol glycols, 0.25% NaOH, and the remainder as water.

[9]Incomplete cleaning was noted with this formula.

[10]Conventional formula = 4.5% potassium pyrophosphate TKPP, 9.25% LAS linear alkane sulfonate acid, 2.24% alpha-olefin sulfonate (AOS), 8% Dowanol glycols, 1.13% NaOH, and the remainder as fragrance/water.

[11]The water actually began to dry before dewatering so the time indicated is for 50% removal by either route.

EXAMPLE 2

Touchless Vehicle Wash Test 2

A "touchless" car washes was made, with and without a fatty alkyl-ether monoamine to test for detergency and even better dewatering effects vs. Example 1. The test was done using a 1 wt % dilution of the footnoted formulas, (i) a low-pressure spray application of 100 ml of the diluted test solution was made to a 16 $ft^2$ side panel on a white 1994 Dodge Caravan, (ii) then allowing a 30 second wait time, and (iii) finally a high (600 psi) pressure water rinse using approximately 0.5 gallon of well water.

Table 2 illustrates the improved dewatering effects when using the amine vs. a conventional detergent. Better results for the primary vs. ether diamine are also shown. The panels were evaluated with a gloss meter for gloss, and visually for dewatering. The relative % gloss values shows both amine formulas (runs 1 and 2) to yield gloss values greater than the conventional formula (run 3); and that the amine can impart a "shine" to the surface that enhances the surface gloss to >100% values.

TABLE 2

Touchless Car Formula Tests Using Alkyl Ether Diamines and Monoamines

| Run # | Detergent Formulas[1] | Alkyl Ether Amine | Vehicle Surface Final Gloss Reading[2] | 50% Dewatering Rate (min:sec)[3] |
|---|---|---|---|---|
| 1 | fatty alkyl-ether diamine formula D[4] | Tomah DA-1618 | 111% | 0:11 |
| 2 | fatty alkyl-ether monoamine formula D[5] | Tomah PA-19 | 110% | 0:03 |
| 3 | conventional (non-amine) formula[6] | none | 96% | >3.00[7] |

[1]The footnoted detergent concentrates were made as listed, but used as 1.0 wt % dilutions.

[2]Gloss increase measured with a hand-held gloss meter; measuring the surface gloss after cleaning in 3 areas of the vehicles driver side surface (an avg. of 6 gloss measurements per area). The gloss readings were after 5 min. of drying time.

[3]Dewatering rate = visual evaluation time for 50% of the water to drain from the surface.

[4]Formula D diamine = 2.7% Varonic K-215, 14% Versonol 120, 3.0% Tomah DA-1618, 3.2% amine oxide, 10.0% nonionic surfactants, 0.25% NaOH, and the remainder as water.

[5]Formula D monoamine = 2.7% Varonic K-215, 14% Versonol 120, 3.0% $C_{12-14}$ oxypropyl-amine (Tomah PA-19), 3.2% amine oxide, 10.0% nonionic surfactant, 0.25% NaOH, and the remainder as water.

[6]Conventional formula = 4.5% TKPP, 9.25% LAS acid, 2.24% AOS, 8% Dowanol glycols, 1.13% NaOH, and the remainder as fragrance/water.

[7]The water actually began to dry before dewatering so the time indicated is for 50% removal by either route.

EXAMPLE 3

Mechanical Vehicle Wash Test

Mechanical-brush vehicle washes were made with and without a fatty ether amine to test for enhanced gloss, water removal, and spotting. Table 3 illustrates the improved effects when using the fatty ether amine. The vehicle surfaces were evaluated with a gloss meter for gloss, and visually for dewatering and spotting. A dewatering improvement of the amine formulas vs. the conventional formulas was determined using the gravimetrically determined water weight remaining on the vehicle side surface after a 30 second drain time. Then 100%×( 1 - wt on amine treated surface )=dewatering wt on conventional surface improvement.

TABLE 3

Mechanical Brush Formula Tests[1]

| Run # | Test Vehicle | Detergent Formula | Vehicle Surface Gloss Increase (vs. soiled state)[2] | 50% Dewatering Rate[3] (minisec) | Residual Water Removal Amine vs. Conventional (% dewatering improvement) | Water Spot Rating[4] |
|---|---|---|---|---|---|---|
| 1 | Truck 1 | alkyl-ether-diamine formula 1[5] | 57% | 0:04 | 83% | 1.5 |
| 2 | Truck 1 | Conventional 1 (amine free)[6] | 49% | 1:58 | — | 3 |

| Run # | Test Vehicle | Detergent Formula | Vehicle Surface Gloss Increase (vs. soiled state)[12] | 50% Dewatering Rate[13] (minisec) | Residual Water Removal Amine vs. Conventional (% dewatering improvement) | Water Spot Rating[14] |
|---|---|---|---|---|---|---|
| 3 | Truck 2 | alkyl-ether-diamine formula 1[5] | 31% | 0:08 | 87% | 2 |
| 4 | Truck 2 | Conventional 1 (amine free)[6] | 18% | 3:17 | — | 4 |
| 5 | Truck 3 | alkyl-ether-diamine formula 1[5] | 33% | 0:04 | 86% | 1.5 |
| 6 | Truck 3 | Conventional 1 (amine free)[6] | 28% | 2:05 | — | 4 |
| 7 | car 1 | alkyl-ether-diamine formula 2[7] | 125% | 0:06 | 75% | ND |
| 8 | car 1 | Conventional 2 (amine free)[8] | 101% | 3:00 | — | ND |

[1]Two wash formulas were tested on: 1) industrial linen distribution vehicles (10' high, 20' long, 8' width), or ii) a 1989 blue Ford Taurus wagon, using mechanical scrub brushes. Mechanical brush washings were made using 1.3 vol % dilutions of the concentrated formulas, with and without amine additives, and the surfaces tested for enhanced gloss, water removal, and visual spotting.
[2]Gloss increase measured with a hand-held gloss meter; measuring the surface gloss before and after cleaning in 4 quarters of the truck side surfaces (avg. of 3 measurements per area). Gloss % increase = gloss (before # - after #)/before #) × 100%.
[3]Dewatering rate = visual evaluation time for 50% of the water to drain from the surface.
[4]1 = no too few water spots, small diameter, easily removed by wiping.
2 = a few water spots, medium in size, easily removed by wiping.
3 = a few too many water spots, large in size, difficult to remove by wiping.
4 = many water spots, large insize, difficult to remove, dirty looking.
ND = no data
[5]Amine formula 1 = 2% Varonic K-215, 7% EDTA, 3% Tomah DA-1618, 3.2% amine oxide, 10% nonionic surfactants, 10% Dowanol glycols, 0.25% NaOH, and the remainder as water.
[6]Conventional formula 2 = 4.5% TKPP, 9.25% LAS acid, 2.24% AOS, 8% Dowanol glycols, 1.13% NaOH, and the remainder as fragrance/water.
[12]Gloss increase measured with a hand-held gloss meter; measuring the surface gloss before and after cleaning in 4 quarters of the truck side surfaces (avg. of 3 measurements per area). Gloss % increase = gloss ((before # - after #)/before #) × 100%.
[13]Dewatering rate = Visual evaluation time for 50% of the water to drain from the surface.
[14]1 = no too few water spots, small diameter, easily removed by wiping.
2 = a few water spots, medium in size, easily removed by wiping.
3 = a few too many water spots, large in size, difficult to remove by wiping.
4 = many water spots, large insize, difficult to remove, dirty looking.
ND — no data
[7]Amine formula 2 = 2% Tomah DA-19, 14.0% Versene 100, 2.4% amine oxide, 10% ethoxylated nonionic surfactants, 10% Dowanol DPNP/DPM, and the remainder as water.
[8]Conventional formula 2 = 14.0% Versene 100, 2.4% amine oxide, 10% ethoxylated nonionic surfactants, 10% Dowanol DPN:/DPM, and the remainder as water.

EXAMPLE 4

Glass Dewatering Using Fatty Ether Amines

To determine the water repellency of the fatty ether amine materials on tile-glass surfaces, aqueous 0.03 wt %-active solutions were made (at various pH's), the solutions applied over the tile-glass surface, and rinsed with city water till the water quickly ran off (~5 seconds rinse). The tile was then dried overnight and was re-rinsed with 100 mls of soft water and, after 10 seconds of drain time, the residual surface water was determined gravimetrically. The data of Table 4 shows the dewatering effect of the various amines. Water removal of >90% for all the amine containing test formulas (runs 1–11) was observed relative to the non-amine test controls (runs 1–2). Also, the current invention examples show substantial improvement of the prior art commercial formulas (runs 12–20).

TABLE 4

Water Repellency[1]

| Run # | Amine Compound | Test Solution pH[2] | Residual Water (grams) | Water Removal (% vs. control)[3] |
|---|---|---|---|---|
| 1 | control (no amine)[4] | 2.8 | 4.03 | — |
| 2 | control (no amine)[4] | 10.8 | 5.62 | — |

TABLE 4-continued

| Run # | Amine Compound | Test Solution pH[2] | Residual Water (grams) | Water Removal (% vs. control)[3] |
|---|---|---|---|---|
| | Water Repellency[1] | | | |
| | Composition of the Invention | | | |
| 3 | $C_{12-15}$ linear ether diamine[5] | 2.6 | 0.12 | 97% |
| 4 | $C_{12-15}$ linear ether diamine[5] | 10.6 | 0.23 | 96% |
| 5 | $C_{12-15}$ linear ether monoamine[6] | 2.3 | 0.08 | 98% |
| 6 | $C_{12-15}$ linear ether monoamine[6] | 10.7 | 0.16 | 97% |
| 7 | car wash I[7] + PA-19 | 11.3 | 0.18 | 97% |
| 8 | car wash II + PA-19[6] | 11.3 | 0.15 | 97% |
| 9 | car wash II[8] + DA-19[5] | 11.2 | 0.21 | 96% |
| 10 | car wash II[8] + DA-1618[9] | 11.1 | 0.26 | 95% |
| 11 | acid cleaner I[10] + DA-19[5] | 2.7 | 0.06 | 99% |
| | Prior Art | | | |
| 12 | BELIEVE[11] | 10.4 | 4.92 | 12% |
| 13 | ZIP WAX CAR WASH - SHINE[12] | 8.7 | 5.03 | 10% |
| 14 | SUDDEN SHINE CLEAN & SHINE[13] | 7.0 | 5.61 | <1% |
| 15 | ethoxylated alkyl amine I[14] | 3.0 | 3.98 | 1% |
| 16 | ethoxylated alkyl amine II[15] | 10.0 | 5.87 | 0% |
| 17 | alkyl dimethyl benzyl quat[16] | 2.7 | 3.69 | 8% |
| 18 | alkyl dimethyl benzyl quat[16] | 9.2 | 5.43 | 3% |
| 19 | alkyl amine acetate[17] | 4.7 | 0.55 | 87% |
| 20 | alkyl amine/diamine mixture[18] | 9.8 | 0.38 | 78% |

[1]The test amines or ammonium formulas were made up as 3 wt % amine in the test solutions. The commercial products (lines 17, 18, 19) were not prediluted. Each formula was tested using 12" × 12" glass squares which were treated with 1.5 vol % aqueous dilutions of the aforementioned solutions, at various pH's, then rinsed under well water for 5 seconds, and finally drained for 5 seconds. The residual surface water was determined gravimetrically.
[2]The pH was adjusted with glycolic or acetic acids.
[3]Water removal was calculated using 100 × (1 − residual water test sample/residual water control); where the residual water control used was control sample line-1 for test solutions at pH's <7.0 and control sample line-2 for pH's >7.0.
[4]Well water neutralized with glycolic acid or NaOH; i.e., no amines or ammonium compounds present.
[5]Tomah DA-19.
[6]Tomah PA-19.
[7]Car wash I = 3% ethoxylated amine, 7% EDTA, 3% Tomah PA-19, 3% amine oxide, 10% nonionic surfactant, 2% silicate, 1% NaOH, and the remainder as fragrance/water.
[8]Car wash II = 6% monoethanol amine MEA, 5% EDTA, 8% betaine surfactant, 20% glycol solvents, 6% LAS, 3% amines, remainder as fragrance/water.
[9]Tomah DA-1618.
[10]Acid cleaner I = 7% sulfamic acid, 7.5% citric acid, 12% amine oxide, 9% glycol solvents, 10% phosphoric acid, remainder as fragrance/dye/water.
[11]BELIEVE is an industrial car wash detergent for high pressure washing, from S. C. Johnson Co., Rascine, WI.
[12]ZIP WAX is a commercial car wash detergent, from Turtle Wax, Inc., Chicago, IL.
[13]SUDDEN SHINE is a consumer car shine and windshield dewatering aid, from Plastone Co., Bedford Park, IL.
[14]Prior art using ethoxylated alkylamines; JP 63048398, Ger. Offen DE 4,412,380, GB 2036783 using Exxon ET-5.
[15]Prior art as in ref. 14, but using Varonic K-215.
[16]Prior art using quats like WO 9222632, US 4,284,435, JP 58076477 using 0372 from Ecolab.
[17]Prior art like WO 9222632, US 3440063 using Armene OL.
[18]Prior art like US 3440063 using an amine mixture = 2:1:0.5 of Duomene OL:Duomene CD:Armene OL.

EXAMPLE 5

Measurement of Car Wash Brush Lubricating Action

The dewatering fatty alkyl ether amines of the invention can also impart a lubricious component to the polymeric brush heads used in mechanical transportation washers. This friction reduction is deemed important for minimizing scratching and wear in mechanical car wash systems employing polymeric bristle brushes to enhance auto soil removal. Recognizing a near logarithmic scale for the relative coefficient of friction (COF), the results show the remarkable improvement in lubricity of this patent (lines 1–5) vs. the prior art (lines 6–7). The COF's below 1.00 are indicative of minimal drag, while those of the prior art above 1.00 impart considerable wear to hard surfaces, and those above ~1.3 COF indicate extreme wear.

TABLE 5

| Test # | Friction Wash Formula | Test Amine | Relative Coefficient of Friction[2] |
|---|---|---|---|
| | Lubricity of Polymeric Washing Brush Surfaces[1] | | |
| 1 | car wash formula 1[3] | DA-1618 | 0.90 |
| 2 | car wash formula 2[4] | DA-1618 | 0.99 |
| 3 | car wash formula 3[5] | DA-1618 | 0.97 |
| 4 | car wash formula 4[6] | DA-18 | 0.95 |
| 6 | BELIEVE CAR WASH[8] | benzyl quat | 1.33 |
| 7 | ZIP WAX CAR WASH[9] | none | 1.22 |

[1]Samples for lubricity measure were diluted to 0.1% (unless otherwise stated) with distilled water containing 200 ppm $NaHCO_3$, and streamed along the perimeter of a polished stainless steel plate measuring 20.5 cm in diameter. The plate was connected to an electric motor, and rotated at an even rate when switched on. A polyester disk weighing 238 gm was attached to a load cell and placed on the plate in the area wetted by the lubricant solution. When the electric motor was switched on, the disk glided freely on the plate. The drag between the polyester surface and the stainless steel plate was detected by the load cell, and transferred to a chart recorder. To assure consistency of the test method, the drag from a standard reference anionic wash detergent solution was measured before and after each trial run, and the value obtained therefrom arbitrarily assigned a coefficient of friction of 1.00. Each trial run was referenced to the fatty acid lubricant trials, thus the results are reported as a relative coefficient of friction vs. this standard.
[2]Control car wash concentrate for lubricity COF reference: 2.0% hydrotrope, 4.0% SXS, 10.0% EDTA, 8.0% nonionic surfactant, 13.5% TEA, 10.0% anionic surfactants, and the remainder soft water.
[3]7.0% glycols, 9.0% amine, 4.0% neutralizing acid, 2% linear nonionic surfactant, and the remainder as soft water.
[4]7.0% glycols, 9.0% amine, 4.0% neutralizing acid, 2% secondary nonionic surfactant, and the remainder as soft water.
[5]7.0% glycols, 9.0% amine, 4.0% neutralizing acid, 1% secondary nonionic surfactant, and the remainder as soft water.
[6]7.0% glycols, 6.0% amine, 4.0% neutralizing acid, 10% secondary nonionic surfactant, and the remainder as soft water.
[8]BELIEVE is an industrial car wash detergent for high pressure washing, from S. C. Johnson Co., Rascine, WI.
[9]ZIP WAX is a commercial car wash detergent, from Turth Wax, Inc., Chicago, IL.

EXAMPLE 6

Measurement of Car Wash Spotting by Hard Waters

A test was performed to determine the ability of coatings of the fatty amines of the invention to repel or minimize ever present, and unsightly, water spots in detergent products (like windshield dewatering aids). Because this soil, on a windshield, is one of the more visual for a consumer, any control would be quite beneficial. Tables 6 and 7 list evaluations for various amines, 2 control samples, and 4 examples of competitive art for hard water scale formation.

The test was conducted by applying the amine coating to a glassy-ceramic titled surface, except for the control samples, then followed by 15 well water rinses, with 30-minute drying between rinses. The tiles were visually evaluated at the end of the 15 cycles on a scale of 1–4 (see reference #2 in Table 6).

The current results show that the longer chain (>C12) alkyl-ether amines function extremely well as hard-surface water spot inhibitors while the prior art is less effective, and sometimes comparable to no treatment at all.

TABLE 6

Anti-Scaling Properties of Amine Coatings Using Well Water

| Run # | Amine Anti-Sealant | Test Solution pH[1] | Final Well Water Spot Rating[2] |
|---|---|---|---|
| | Compositions of the Invention | | |
| 1 | $C_{12-15}$ linear ether diamine[3] | 2.6 | 1 |
| 2 | $C_{12-15}$ linear ether diamine[3] | 6.0 | 1 |
| 3 | $C_{12-15}$ linear ether diamine[3] | 10.5 | 1 |
| 4 | $C_{12-14}$ linear ether diamine[4] | 2.2 | 1 |
| 5 | $C_{12-14}$ linear ether diamine[4] | 8.8 | 1 |
| 6 | branched isotridecyl ether diamine[5] | 3.0 | 2 |
| 7 | branched isotridecyl ether diamine[5] | 8.0 | 2 |
| 8 | $C_{8-10}$ linear ether monoamine[6] | 8.4 | 3 |
| 9 | $C_{8-10}$ linear ether monoamine[6] | 3.2 | 4 |
| | Prior Art | | |
| 10 | prior art[7]; ethoxylated alkyl amine[8] | 8.0 | 2 |
| 11 | prior art[9]; benzyl quat[10] | 2.7 | 4 |
| 12 | prior art[9]; benzyl quat[10] | 7.4 | 4 |
| 13 | none (control A)[11] | 3.1 | 4 |
| 14 | none (control B)[11] | 8.6 | 4 |

[1]pH adjusted with glycolic acid.
[2]1 = no to few water spots, small diameter, easily removed by wiping.
2 = a few water spots, medium in size, easily removed by wiping.
3 = a few to many water spots, large in size, difficult to remove by wiping.
4 = many water spots, large in size, difficult to remove, dirty looking.
[3]Tomah DA-19.
[4]Tomah DA-1618.
[5]Tomah DA-17.
[6]Tomah PA-1214.
[9]current art using quats; JP 58076477.
[10]Ecolab Q372 quat.
[11]Control = a tile cleaned with Chlorox cleanser, rinsed five times, and dried.

EXAMPLE 7

Water Spot Reduction in Detergent Cleaners

Example 6 was repeated but now using formulated detergent cleaners instead of dewatering aids. Similar control of water spotting can be achieved.

TABLE 7

Anti-Spotting Properties of Amine Coatings in Formulated Cleaners

| Run # | Cleaning Product | Test Solution pH | Final Well Water Spot Rating[1] |
|---|---|---|---|
| 1 | acid cleaner[2] (no amine) | 2.6 | 4 |
| 2 | acid cleaner[2] (with ether amine)[3] | 3.0 | 1 |
| 3 | neutral cleaner[4] (no amine) | 7.1 | 4 |
| 4 | neutral cleaner[4] (with ether amine)[3] | 6.7 | 1 |
| 5 | alkaline cleaner[5] (no amine) | 10.3 | 4 |
| 6 | alkaline cleaner[5] (with ether amine)[3] | 10.3 | 2 |

[1]Concentrated cleaners used at recommended 2oz/gal. dilution.
[2]Acid Cleaner = 7% sulfamic acid, 7.5% citric acid, 12% amine oxide, 9% glycol solvents, 10% phosphoric acid, remainder as fragrance/dye/water.
[3]Amine = Tomah DA-19.
[4]neutral cleaner: 6.8% acetic acid, 9.6% KOH, 10.0% linear alcohol ethoxylate, 10.0% hexylene glycol, remainder water. Additional KOH used for neutralization when no amine present.
[5]Alkaline Cleaner = 6% MEA, 5% EDTA, 8% betaine surfactant, 20% glycol solvents, 6% LAS, remainder as fragrance/water.

EXAMPLE 8

Testing Procedure for Concentrate Stability

Detergent samples were prepared fatty alkyl ether amines of the invention, and the prior art as taught by Chestochowski[2] and Fasterding[2], with alcohol or glycol-type solvents added at various levels to fulfill the prior art's requirement for a stabilizing hydrotrope. Samples were warmed to 49° C. and stirred continuously for 30 minutes, after which time formula stability was assessed visually. The results, shown in Table 8, demonstrate an advantage to the incorporation of the highly soluble linear alkyl ether amines or diamines, insofar as a hydrotrope is not required for concentrate stability. This is a departure from the prior art as described by the cited references; i.e., the use of alkyl ether amines and diamines allows for minimizing or eliminating co-solvents and hydrotropes, while the formulas of the prior art require substantial hydrotrope coupling.

TABLE 8

Concentrate Stability with Hydrotropes at Various Levels

| | Base Formula | Hydrotrope | % | Concentrate Stability |
|---|---|---|---|---|
| current invention[1] | alkyl ether diamine | — | 0.0 | OK |
| prior art[2] | alkyl diamine | — | 0.0 | undissolved solids[3] |
| current invention[1] | alkyl ether diamine | propylene glycol | 2.5 | OK |
| prior art[2] | alkyl diamine | propylene glycol | 2.5 | undissolved solids |
| current | alkyl ether | propylene | 5.0 | OK |

TABLE 8-continued

| Concentrate Stability with Hydrotropes at Various Levels | | | | |
|---|---|---|---|---|
| | Base Formula | Hydrotrope | % | Concentrate Stability |
| invention[1] | diamine | glycol | | |
| prior art[2] | alkyl diamine | propylene glycol | 5.0 | undissolved solids |
| current invention[1] | alkyl ether diamine | hexylene glycol | 2.5 | OK |
| prior art[2] | alkyl diamine | hexylene glycol | 2.5 | undissolved solids |
| current invention[1] | alkyl ether diamine | hexylene glycol | 5.0 | OK |
| prior art[2] | alkyl diamine | hexylene glycol | 5.0 | OK |
| current invention[1] | alkyl ether diamine | isopropanol | 2.5 | OK |
| prior art[2] | alkyl diamine | isopropanol | 2.5 | undissolved solids |
| current invention[1] | alkyl ether diamine | isopropanol | 5.0 | OK |
| prior art[2] | alkyl diamine | isopropanol | 5.0 | OK |

[1]Proposed art incorporating linear alkyl ether diamines, formulated as follows: designated hydrotrope with 2.5% acetic acid, 10.0% $C_{12-14}$ alkyloxypropyl-1,3-diamino propane, 10.0% nonionic surfactant, and the remainder soft water.
[2]Prior art as per DD 91104, US 3440063, and DE 3439440 formulated with designated hydrotropes and 2.5% acetic acid, 6.6% N-Oleyl-1,3-diamino propane, 3.4% N-coco-1,3-diamino propane, 10% nonionic surfactant, and the remainder soft water.
[3]Undissolved solids in the liquid material are not desirable, single phase liquids are preferred.

EXAMPLE 9

Test Procedure for Use Solution Clarity at Various pH's

Samples representing the proposed invention and the prior art set forth in the footnotes of Table 9 were formulated according to the compositions in Table 9 below. One percent solutions were prepared using the challenge water diluent (below), and the solution pH adjusted to 5–10 with dilute acetic acid or KOH. Clouding behavior was determined after 15 minutes. Surprisingly, the superior solubility of the proposed arts linear alkyl ether (di)amines as evidenced by the aforementioned concentrate stability, is buttressed by a tolerance for anions which is unsurpassed by the current fatty amine technology. The alkyl ether (di)amines allow for an extended pH range for formulation, and selection of the appropriate alkyl ether amine raw material allows for a formulation pH range not available with the prior art amines.

Preparation of Challenge Water

A test of clouding behavior of detergent solutions as per Weber[6] was done. A 500 ppm $Na_2SO_4$ and 500 ppm NaCl softened water preparation was made. This anion-laden water was used as the detergent diluent.

TABLE 9

| Solution Clarity at pH 5–10 in Anion-Laden Soft Water | | | | | | | | | |
|---|---|---|---|---|---|---|---|---|---|
| Compositions | | | | 1% Solution Clarity in Challenge[1] Water pH[2] | | | | | |
| Test | Formula | Amine Type | % | 5 | 6 | 7 | 8 | 10 | 11 |
| Proposed Art | | | | | | | | | |
| 1 | detergent I[3] | tetradecyloxypropyl-1,3-diamino propane | 8 | clear | clear | clear | clear | cloudy | — |
| 2 | detergent II[3] | $C_{12-14}$alkyloxypropyl-1,3 diamino propane | 8 | clear | clear | clear | clear | cloudy | — |
| 3 | detergent III[3] | $C_{12-14}$alkyloxypropane 1,3 diamino propane | 6 | clear | clear | clear | clear | cloudy | — |
| 4 | detergent IV[4] | $C_{12-15}$alkyl-oxypropylamine | 3 | — | — | — | — | — | clear |
| 5 | detergent IV[4] | $C_{12-14}$alkyloxypropyl-1,3 diamino propane | 3 | — | — | — | — | — | clear |
| Prior Art | | | | | | | | | |
| 6 | prior art I[4,5,6] | cocoamine | 3 | — | — | — | — | — | cloudy |
| 7 | prior art I[4,5,6] | oleylamine | 3 | — | — | — | — | — | cloudy |
| 9 | prior art III[3,5,6] | N-oleyl-1,3-diamino propane | 8 | hazy/opaque | hazy/opaque | cloudy | cloudy | cloudy | — |
| 10 | prior II[3,5,6] | N-oleyl/cocoa-1,3-diamino propane | 4/4 | clear | clear | clear | cloudy | cloudy | — |
| 11 | prior art III[3,5,6] | N-oleyl/cocoa-1,3-diamino propane | 4/4 | clear | clear | clear | cloudy | cloudy | — |

TABLE 9-continued

Solution Clarity at pH 5–10 in Anion-Laden Soft Water

| Compositions | | | | 1% Solution Clarity in Challenge[1] Water pH[2] | | | | | |
|---|---|---|---|---|---|---|---|---|---|
| Test | Formula | Amine Type | % | 5 | 6 | 7 | 8 | 10 | 11 |
| 12 | prior art III[3,5,6] | N-oleyl/coco-1,3-diamino propane | 4/2 | cloudy | clear | clear | cloudy | cloudy | — |

[1]Challenge water prepared by adding 500 ppm $Na_2SO_4$ and 500 ppm NaCl to softened water.
[2]1% detergent solutions adjusted to pH 5, 6, 7, 8, 9 or 10 with dilute acetic acid or dilute KOH.
[3]Composition of formulas: 8.0% total amines, 10.0% hydrotrope, 1.8% acetic acid, 10.0% nonionic surfactant, and 70.2% water.
[4]Composition of formula: 3.0% amine, 7.0% EDTA, 12.7% alcohol and alkylamine nonionic surfactants, 2.5% builder, 3.2% amine oxide.
[5]Prior art as taught by DD 91104, US 3440063, and DE 3439440.
[6]Prior art examples presented in US 5441654, and US 5062978.

EXAMPLE 10

Test Procedure for Concentrate Flammability

Windshield dewatering samples representing the proposed invention and the prior art were tested for consumer safety by pouring 1 gram of the formula concentrate on a watch glass slide and heating with a propane flame. The results of Table 10 show a subjective rating of the products, and demonstrate the aqueous fatty alkyl ether amines to be much safer for general use over the prior art. The current invention samples (test 1–3) went to dryness, while all the prior art examples (4–7) supported rapid to instantaneous combustion.

TABLE 10

Flammability of Window Dewatering Aids[1]

| Test # | Wash Formula | Flammability |
|---|---|---|
| | Current Art | |
| 1 | car dewatering formula 3[2] | flash point >180° F. |
| 2 | car dewatering formula 4[2] | flash point >180° F. |
| 3 | car dewatering formula 5[2] | flash point >180° F. |
| | Prior Art | |
| 4 | SUDDEN SHINE[3] | flammable |
| 5 | RAIN-X[4] | very flammable |
| 6 | prior art I[5] | very flammable |
| 7 | prior art II[6] | flammable |

[1]Samples representing the proposed invention and the prior art were tested for consumer safety by pouring 1 gram of the formula concentrate on a watch glass slide and heating with a propane flame. The results show a subjective rating of the products.
[2]Same test samples as noted in Table 5.
[3]SUDDEN SHINE is a commercial auto dewatering aid from Plastone Co., Chicago, IL.
[4]RAIN-X is a commercial auto windshield dewatering aid, from ____, Phoenix, AZ.
[5]prior art as taught in DD 91104.
[6]prior art as taught in DE 3439440.

TABLE 11

| Vendor | Trade Name | Chemical Name | R group |
|---|---|---|---|
| | Commercially Available Diamines and Ether Diamines Cited in the Examples | | |
| Tomah | DA-19 | $C_{12-15}$ alkyloxypropyl-1,3-diamino propane | linear, $C_{12}H_{25}/C_{15}H_{31}$ |
| Tomah | DA-18 | tetradecyloxy-propyl-1,3 diamino propane | linear, $C_{14}H_{29}$ |
| Tomah | DA-17 | isotridecyloxyprop yl-1,3 diamino propane | branched, $C_{12}H_{25}$ |
| Tomah | DA-1618 | $C_{12-14}$ alkyloxypropyl-1,3 diamino propane | linear, $C_{12}H_{25}/C_{14}H_{27}$ |
| Tomah | DA-14 | isodecyloxypropyl-1,3 diamino propane | branched, $C_{10}H_{21}$ |
| Akzo | Duomeen OL | N-oleyl-1,3 diamino propane | linear, $C_{18:1}H_{35}$ |
| Akzo | Duomeen CD | N-coco-1,3 diamino propane | linear $C_{12-14}H_{25-29}$ |
| | Commercially Available Amines and Ether Amines Cited in the Examples | | |
| Tomah | PA-19 | $C_{12-15}$ alkyloxypropyl amine | linear, $C_{12}H_{25}/C_{15}H_{31}$ |
| Tomah | PA-17 | isotridecyloxypropyl amine | branched, $C_{13}H_{27}$ |
| Tomah | PA-16 | isododecyloxypropyl amine | branched, $C_{12}H_{25}$ |
| Tomah | PA-14 | isodecyloxypropyl amine | branched, $C_{10}H_{21}$ |
| Tomah | PA-1214 | octyl/decyloxypropyl amine | branched, $C_8H_{17}/C_{10}H_{21}$ |
| Akzo | Armeen OL | oleylamine | linear, $C_{18:1}H_{35}$ |

Solid Wash and Dry Car Wash Formula

The following formulation was manufactured into a solid block car wash formulation that could be dispensed by spraying the solid composition with water in a dispenser creating a concentrate solution that can be then conveyed to a use locus in a vehicle cleaning station. The formulation is made by introducing ingredients 1 through 4 in a heated stirred tank of appropriate size. After the material is heated and mixed to a temperature of about 75° C., ingredients 5 and 6 are added and mixed until uniform. In the uniform mixture, item 7 is added and mixed until uniform. After equilibration is achieved, powdered ingredients 8 and 9 are slowly added to avoid caking or lumping. The composition is stirred until uniform and charged in 8 pound portions to polyethylene bottles which can then be cooled and solidified. The bottles are ideal for capping, distribution and use at a vehicle cleaning station. The solid formulation achieves results similar to the liquid formulation set forth above.

| Formula | % |
|---|---|
| 1 Nonionic PEG ether of a $C_{12-15}$ alcohol Neodol 25-7 | 12.0 |
| 2 Nonionic PEG ether of a $C_{6-11}$ alcohol Neodol 91-6 | 17.0 |
| 3 EDTA (Liq 40%) | 12.0 |
| 4 Urea | 22.0 |
| 5 Ether amine Tomah DA-1618 | 6.0 |
| 6 Varonic K-215 | 9.0 |
| 7 Admox 14815 | 8.0 |
| 8 EDTA (Pwd) | 11.0 |
| 9 G.D. Silicate | 3.0 |

The above specification, examples and data provide a complete description of the manufacture and use of the composition of the invention. Since many embodiments of the invention can be made without departing from the spirit and scope of the invention, the invention resides in the claims hereinafter appended.

We claim:

1. An aqueous concentrate composition that can be diluted with water to form an aqueous use solution, the concentrate consisting essentially of:

(a) about 0.1 to 50 wt % of a fatty alkyl ether amine composition of the formula:

R—O—$R_2$—NH—A wherein A is $R_3NH_2$ or H; $R_2$, $R_3$ are independently linear or branched alkylene groups of 1 to 6 carbons; and R is a fatty aliphatic group having about 6 to 28 carbon atoms;

(b) an effective amount of stabilizer comprising a neutralizing acid or a nonionic surfactant or mixtures thereof, to solubilize the ether amine; and (c) a major proportion of water;

wherein the aqueous concentrate composition is substantially free of a hydrocarbon wax and a polydimethyl siloxane.

2. The composition of claim 1 wherein the nonionic comprises a $C_{6-24}$ alcohol ethoxylate, a fatty amine ethoxylate, a fatty ether amine ethoxylate, an alkylphenol ethoxylate or mixtures thereof.

3. The composition of claim 1 wherein the fatty alkyl ether amine comprises a $C_{10-20}$ alkyl oxyalkyl-1,3-diaminopropane.

4. The composition of claim 1 wherein the fatty alkyl ether amine comprises a $C_{10-20}$ alkyl oxyalkylamine.

5. The composition of claim 1 consisting essentially of about 1–20 wt % of the fatty alkyl ether amine composition, about 0.1 to about 20 wt % of nonionic surfactant, about 0.01 to about 10 wt % of sufficient acid or base material to obtain a substantially neutral pH and water.

6. The composition of claim 1 comprising about 0.1 to 20 wt % of the fatty alkyl ether amine composition, about 0.1 to 10 wt % of a nonionic surfactant composition or blend thereof and water.

7. The composition of claim 1 wherein the composition comprises an emulsion.

8. An aqueous concentrate composition adapted for dilution to a dilute cleaner composition, the concentrate consisting essentially of:

(a) an alkyl ether amine having the formula:

R—O—$R_2$—NH—A wherein A is $R_3NH_2$ or H; $R_2$, $R_3$ are independently linear or branched alkylene groups of 1 to 6 carbons; and R is a fatty aliphatic group having about 6 to 28 carbon atoms;

(b) a sequestering agent;

(c) an effective amount of stabilizer comprising a neutralizing acid or a nonionic surfactant or mixtures thereof, to solubilize the ether amine;

(d) a $C_{6-24}$ alkyl dimethylamine oxide; and (e) water;

wherein the composition is substantially free of a hydrocarbon wax and is also substantially free of a polydimethyl siloxane.

9. The composition of claim 8 wherein the alkyl ether amine comprises a $C_{10-20}$ alkyl oxypropyl-1,3-diaminopropane.

10. The composition of claim 8 wherein the alkyl ether amine comprises a $C_{10-20}$ alkyloxypropylamine.

11. The composition of claim 8 wherein the sequestering agent comprises an organic chelant.

12. The composition of claim 8 wherein the sequestering agent comprises a condensed phosphate.

13. The composition of claim 8 wherein the sequestering agent comprises ethylene diamine tetraacetic acid, trisodium hydroxyethylene diamine triacetate or salts thereof.

14. The composition of claim 8 wherein the nonionic surfactant comprises an EO/PO block copolymer, an alkylphenol ethoxylate, a linear alcohol ethoxylate a fatty amine ethoxylate or fatty ether amine ethoxylate or mixtures thereof.

15. The composition of claim 10 wherein the composition additionally comprises an ethoxylate amine of the formula R—N(A) (B) where A is $(EO)_x$ and B is $(EO)_y$ or H; wherein EO represents ethyleneoxide, x represents a number from about 1 to 50 and R represents the fatty alkyl group, a fatty alkyl ether group or fatty alkyl ether group having 6–24 carbon atoms.

16. The composition of claim 10 wherein the aqueous concentrate composition has a pH of about 6–13.

17. A method of cleaning a vehicle surface, the method comprising:

(a) contacting a soiled vehicle surface with an aqueous composition comprising a nonionic surfactant and an alkyl ether amine composition of the formula:

R—O—$R_2$—NH—A wherein A is $R_3NH_2$ or H; $R_2$, $R_3$ are independently linear or branched alkylene groups of 1 to 6 carbons; and R is a fatty aliphatic group having about 6 to 28 carbon atoms;

(b) permitting the aqueous composition to remove soil from the surface of the vehicle; and (c) rinsing the soil and amine from the surface of the vehicle using a surface water rinse;

wherein the aqueous composition and rinse is substantially free of a hydrocarbon and a polydimethyl siloxane material.

18. The method of claim 17 wherein the rinse is applied at high pressure.

19. The method of claim 17 wherein the high pressure comprises greater than about 100 pounds per square inch.

20. The method of claim 17 wherein the alkyletheramine comprises a $C_{10-20}$ alkyloxypropyl-1,3-diaminopropane.

21. The method of claim 17 wherein the alkyletheramine comprises a $C_{10-20}$ alkyloxypropylamine.

22. The method of claim 17 wherein the nonionic surfactant comprises a linear alcohol ethoxylate, an alkyl phenol ethoxylate, an EO/PO block copolymer fatty amine ethoxylate, fatty ether amine ethoxylate or mixtures thereof.

23. A method of cleaning soil from a vehicle surface using an aqueous cleaner and surface abrasion, the method comprises:

(a) applying to a vehicle surface an aqueous composition comprising a nonionic surfactant and an alkyl ether amine of the formula:

$$R—O—R_2—NH—A$$

wherein A is $R_3NH_2$ or H; $R_2$, $R_3$ are independently linear or branched alkylene groups of 1 to 6 carbons; and R is a fatty aliphatic group having about 6 to 28 carbon atoms;

(b) subjecting the vehicle surface and the aqueous cleaner to a mechanical action for the purpose of promoting soil removal;

(c) applying an aqueous rinse to the aqueous cleaner composition;

wherein the aqueous cleaner composition is substantially free of a hydrocarbon and is substantially free of a polydimethyl siloxane composition.

24. The method of claim 23 wherein the rinse is applied at high pressure.

25. The method of claim 23 wherein the high pressure comprises greater than about 100 pounds per square inch.

26. The method of claim 23 wherein the alkyletheramine comprises a $C_{10-20}$ alkyloxypropyl-1,3-diaminopropane.

27. The method of claim 23 wherein the alkyletheramine comprises a $C_{10-20}$ alkyloxypropylamine.

28. The method of claim 23 wherein the nonionic surfactant comprises a linear alcohol ethoxylate, an alkyl phenol ethoxylate, an EO/PO block copolymer fatty amine ethoxylate, fatty ether amine ethoxylate or mixtures thereof.

29. A method of dewatering a vehicle surface to produce a clean, shiny vehicle surface, the method comprises:

(a) applying to a substantially clean vehicle surface an aqueous composition comprising a nonionic surfactant and an alkyl ether amine of the formula:

$$R—O—R_2—NH—A$$

wherein A is $R_3NH_2$ or H; $R_2$, $R_3$ are independently linear or branched alkylene groups of 1 to 6 carbons; and R is a fatty aliphatic group having about 6 to 28 carbon atoms; and (b) permitting the aqueous composition to drain from the vehicle surface before returning the vehicle to use;

wherein the aqueous composition is substantially free of a hydrocarbon and is substantially free of a polydimethyl siloxane composition.

30. The method of claim 29 wherein the rinse is applied at high pressure.

31. The method of claim 29 wherein the high pressure comprises greater than about 100 pounds per square inch.

32. The method of claim 29 wherein the alkyletheramine comprises a $C_{10-20}$ alkyloxypropyl-1,3-diaminopropane.

33. The method of claim 29 wherein the alkyletheramine comprises a $C_{10-20}$ alkyloxypropylamine.

34. The method of claim 29 wherein the nonionic surfactant comprises a linear alcohol ethoxylate, an alkyl phenol ethoxylate, an EO/PO block copolymer fatty amine ethoxylate, fatty ether amine ethoxylate or mixtures thereof.

35. A solid block concentrate composition that can be diluted with water to form an aqueous use solution, the concentrate comprising:

(a) about 0.1 to 50 wt % of a fatty alkyl ether amine composition of the formula:

$$R—O—R_2—NH—A$$

wherein A is $R_3NH_2$ or H; $R_2$, $R_3$ are independently linear or branched alkylene groups of 1 to 6 carbons; and R is a fatty aliphatic group having about 6 to 28 carbon atoms;

(b) an effective amount of stabilizer comprising a neutralizing acid or a nonionic surfactant or mixtures thereof, to solubilize the ether amine;

(c) an effective amount of a solidification agent; and (d) a major proportion of water;

wherein the aqueous concentrate composition is substantially free of a hydrocarbon wax and a polydimethyl siloxane.

36. The composition of claim 35 wherein the solidification agent is urea.

37. The composition of claim 35 wherein the nonionic comprises a $C_{6-24}$ alcohol ethoxylate, a fatty amine ethoxylate, a fatty ether amine ethoxylate, an alkylphenol ethoxylate or mixtures thereof.

38. The composition of claim 35 wherein the fatty alkyl ether amine comprises a $C_{10-20}$ alkyl oxyalkyl-1,3-diaminopropane.

39. The composition of claim 35 wherein the fatty alkyl ether amine comprises a $C_{10-20}$ alkyl oxyalkylamine.

40. The composition of claim 35 consisting essentially of about 1–20 wt % of the fatty alkyl ether amine composition, about 0.1 to about 20 wt % of nonionic surfactant, about 0.01 to about 10 wt % of sufficient acid or base material to obtain a substantially neutral pH and water.

41. The composition of claim 35 comprising about 0.1 to 20 wt % of the fatty alkyl ether amine composition, about 0.1 to 10 wt % of a nonionic surfactant composition or blend thereof and water.

42. The composition of claim 35 additionally comprising a sequestrant.

43. The composition of claim 35 additionally comprising a silicate.

44. The composition of claim 35 additionally comprising an amine oxide.

* * * * *